United States Patent
Mintz et al.

(10) Patent No.: US 10,529,112 B1
(45) Date of Patent: Jan. 7, 2020

(54) METHOD AND SYSTEM FOR GENERATING A VISUAL EFFECT OF OBJECT ANIMATION

(71) Applicant: Swaybox Studios, Inc., Shreveport, LA (US)

(72) Inventors: Arthur Mintz, New Orleans, LA (US); Theresa Andersson Mintz, New Orleans, LA (US); Christopher Armand, Shreveport, LA (US); Noah Scruggs, Shreveport, LA (US)

(73) Assignee: SWAYBOX STUDIOS, INC., New Orleans, LA (US)

( * ) Notice: Subject to any disclaimer, the term of this patent is extended or adjusted under 35 U.S.C. 154(b) by 0 days.

(21) Appl. No.: 16/037,628

(22) Filed: Jul. 17, 2018

(51) Int. Cl.
*G06T 13/40* (2011.01)
*H04N 5/232* (2006.01)
*G06T 7/579* (2017.01)

(52) U.S. Cl.
CPC ......... *G06T 13/40* (2013.01); *H04N 5/23299* (2018.08); *G06T 7/579* (2017.01); *G06T 2207/30241* (2013.01); *G06T 2210/44* (2013.01)

(58) Field of Classification Search
None
See application file for complete search history.

(56) References Cited

U.S. PATENT DOCUMENTS

| | | | | |
|---|---|---|---|---|
| 6,707,487 B1* | 3/2004 | Aman | ................ | A63B 24/0003 348/169 |
| 2007/0279494 A1* | 12/2007 | Aman | .................. | G01S 3/7864 348/169 |
| 2010/0007665 A1* | 1/2010 | Smith | ..................... | G06T 13/40 345/473 |
| 2012/0007839 A1* | 1/2012 | Tsao | ....................... | G02B 26/00 345/204 |
| 2014/0378222 A1* | 12/2014 | Balakrishnan | ....... | H04N 5/2224 463/31 |
| 2015/0170367 A1* | 6/2015 | Nachman | ........... | G06K 9/00671 382/106 |
| 2016/0255282 A1* | 9/2016 | Bostick | .............. | H04N 5/23238 348/39 |

\* cited by examiner

*Primary Examiner* — Robert J Craddock
(74) *Attorney, Agent, or Firm* — Bechen PLLC

(57) ABSTRACT

The present invention provides a method and system for generating a visual effect of animation including recording multiple takes of a scene having puppet movement. The puppet includes an object action generated by multiple objects interchangeable in the different takes. Each object represents a different phase of the object action. The method and system electronically captures each take of the scene, each taking include one of the objects. Between takes, the current object is removed and replaced with the next object. After all takes are electronically captured, the method and system electronically merges the multiple takes to generate the merged scene including the visual effect of animation.

20 Claims, 6 Drawing Sheets

METHOD AND SYSTEM FOR GENERATING A VISUAL EFFECT OF OBJECT ANIMATION

COPYRIGHT NOTICE

A portion of the disclosure of this patent document contains material that is subject to copyright protection. The copyright owner has no objection to the facsimile reproduction by anyone of the patent document or the patent disclosure as it appears in the Patent and Trademark Office patent files or records, but otherwise reserves all copyright rights whatsoever.

FIELD OF INVENTION

The present invention relates generally to visual effect generation methods and systems and more specifically to generating animation visual effects with puppets or similar objects.

BACKGROUND

Advanced computing resources significantly improve visual effects associated with image capture and movie-making. Well known technologies include green-screen capture technology, digital overlay, and other post-processing techniques to transform raw camera-feed footage. Image processing technology has also advanced in the animation space, including improvements in generating digitally animated movies.

There are significant advances relating to image capture and actor generated visual effects. But limited advancements are found in other areas. For example, with puppetry, the physical nature of puppet and the user-controlled movement inhibit advanced animation techniques. To create multiple takes of a scene, the puppeteer must move the puppet identically for each take. This can be a difficult task. Minor variations in puppet movements between takes can become visible in an edited scene or movie.

Another limitation with puppetry is the static nature of the puppet itself. The puppet is a physical object, thus introducing a range of limitations for showing expression. For example, the physical nature of the puppet complicates facial expressions or other expressive movements.

For example, under current techniques, it is complicated and inefficient to generate a facial expression on a puppet in a scene, such as making the puppet smile. There are physical limitations of the medium itself, a physical object and the ability to properly manipulate the object to generate animation. For example, facial movements are inherently restricted to the movement available to the puppet itself, e.g. rolling eyes, opening mouth, etc.

One technique is for generating a visual effect with a physical object is stop-motion, manually adjusting the object frame by frame. This technique is not suited for puppetry, as the filming of puppetry is in real-time filming and stop-motion appears too jittery, creating a negative visual effect.

For puppetry, one technique is pure post-processing, using a two-dimensional processing technique to push around a puppet mouth shape, commonly referred to as a liquefy operation. This technique is limited because it is a two-dimensional technique and is only as good as the technician generating the computerized-image.

Therefore, there exists a need for improving the visual effects and generation of animation using a physical device such as a puppet or other object being, including a need for overcoming limitations of manual manipulation of object(s) during scene capture operations.

BRIEF DESCRIPTION

The present invention provides a method and system for generating a visual effect of animation. The method and system records multiple takes of a scene having an object perform an action. The object itself is actually composed of multiple variations, each representing a different phase of the object action. The difference phases are captured in succeeding takes of the scene. For example, if the object is a head and the action is smiling, the multiple takes with multiple variations can represent the multiple phases for smiling.

The method and system includes a motion track for the object movement. In the example of a puppet, the motion track can include moving one or more components of the puppet, such as arm(s), leg(s), head, etc. The motion track allows for the reproduceable movement of the puppet, and subsequently reproduceable movement of the object.

In the method and system, a defined scene is recorded multiple times, at least once for each variation of the object. For example, a first take uses a first variation, a second take uses a second variation, etc. Between takes, the method and system includes changing the variations of the object. The method and system therein electronically captures these multiple takes of the scene with each of the multiple variations.

To generate a visual effect of animation, the method and system uses a computer processing device to electronically merge the multiple takes. The electronic merging can include fading out of one take and into another take at appropriate timing intervals. The completed, merged, video then provides the visual effect of animation.

The granularity or smoothness of the animation effect depends, in part, on the differences between variations, and more specifically on the granularity of the different phases. A higher number of variations generates a smoother visual effect as the takes include more phases of the object action.

In one embodiment, the method and system may also include electronically generating intermediate graphical representations. These intermediate graphical representations simulate or otherwise smooth a visual transition between neighboring phases of the object action. In one embodiment, the intermediate graphical representation may be generated using a computerized morphing technology.

By way of example, if the object action is a puppet head generating a large smile and rolling its eyes, this sequence could take 3 seconds. The object, puppet head, is placed on a puppet body. Based on generating animation at 24 frames per second, the objection action could be broken down into 25 phases. Thus, 25 variations are created, each at different phases. The scene is captured in 25 takes, each time using a different puppet head on the body. The movement of the puppet is controlled and common to all takes because of the motion track or a highly skilled puppeteer. The computerized processing device then electronically merges these 25 takes into a single track to generate the visual effect of animation of the object action.

A better understanding of the disclosed technology will be obtained from the following detailed description of the preferred embodiments taken in conjunction with the drawings and the attached claims.

DETAILED DESCRIPTION

Figure 1:
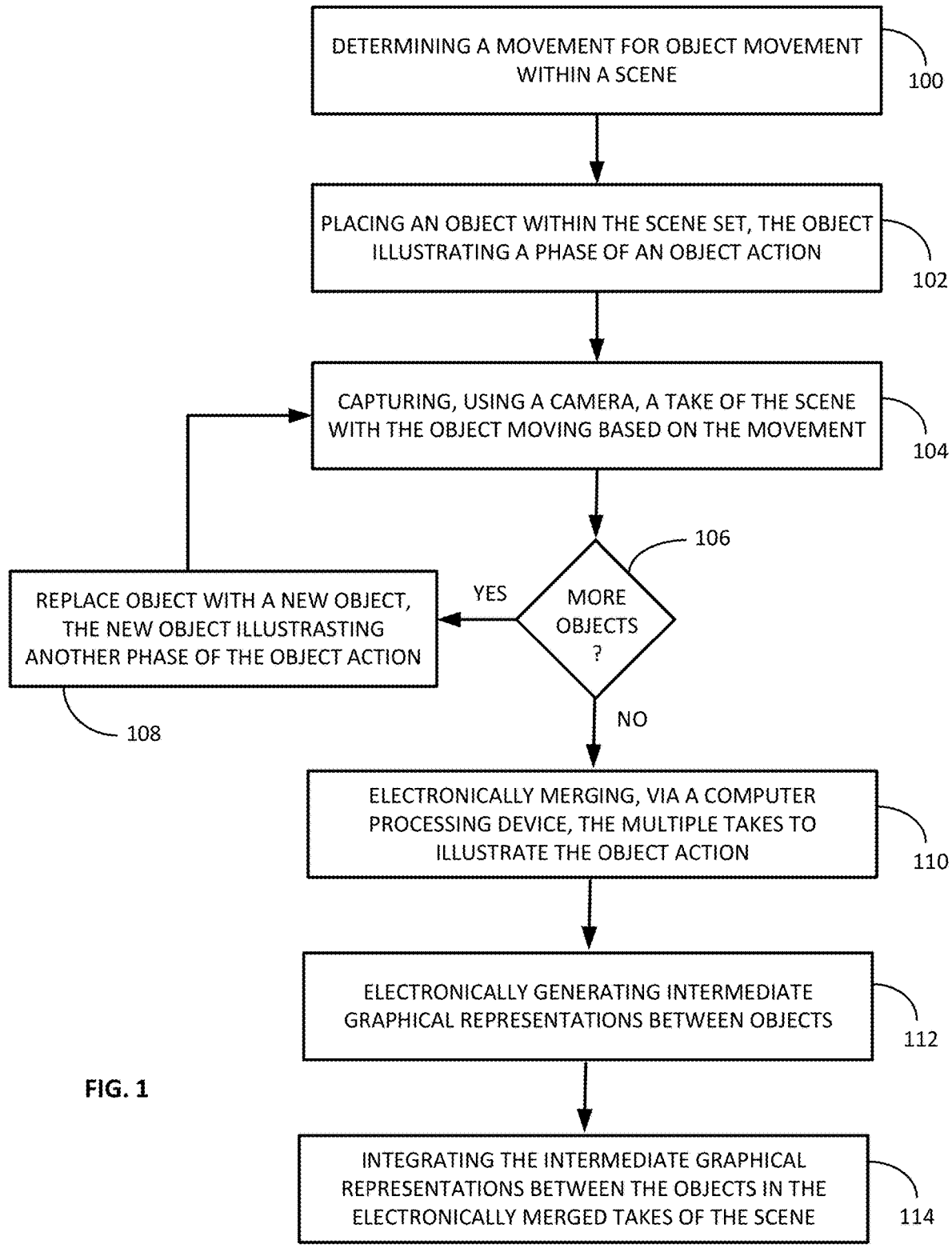
FIG. 1 illustrates a flowchart of steps of one embodiment of a method for generating a visual effect of animation.

FIG. 1 illustrates a flowchart of steps for generating a visual effect of animation. The animation is a visual effect from a physical object, such as a puppet. Using the visual effect described herein generates the animation.

Step 100 is determining a motion track for object movement within a scene. A scene is a self-contained segment of video recording, where multiple scenes are combined to make a movie. The object can be a full object within the scene, such as a puppet, or an object can be a piece of a puppet, such as a head, hand, etc.

The motion track represents the movement sequence of the object, in the example of the object being a puppet, a motion tracks defines the sequence of movement of the puppet. For example, object movement may be the effect of the puppet walking, including movements of raising opposing arm and legs to simulate walking. The scene may include the puppet generating a wide smile while walking. In one embodiment, the motion track may be recorded or generated based on a puppeteer controlling the puppet, this then translated into motion rig controls. In another embodiment, the puppeteer can manually repeat the movement for multiple takes.

Step 102 is placing the object within a scene set, the object illustrating a phase of an object action. In this example, the object action is the generating of a wide smile. A first phase may be a flat mouth, a second phase being the widening of the lips, rising of the check bones, a third phase being the outer edges of the lips extending upward, the fourth phase showing a full smile, and the fifth phase exposing the teeth in a large toothy grin. For example, this may include actually creating five variations via five different puppet heads to be interchanged on the puppet body between takes of the scene.

In step 102, the object is placed in the scene, the object representing a first phase. Step 104 provides for capturing a take of the scene with the object moving along the motion track. A camera electronically captures the take of the scene.

Step 106 is a determination step, if there are more objects. As each object represents a different phase of the object action, the method provides for capturing a new take of the scene with each of the objects. Each object is a variation of each other. Thus, if the inquiry in step 106 is yes, step 108 is to replace the object with a new object, the new object illustrating another phase of the object action.

For each object representing a different phase, there is a different physical object. Here, the replacement step may be removing the prior object from a puppet and then placing the new object thereon.

The method reverts to step 104, capturing the new take with the replacement object moving along the motion track. The method iterates for objects. In example above, if the object action is generating a smile and there are five phases, there are then five objects, each being variations of each other. The method iterates to generate five takes of the scene, each showing the same movement of the puppet and the objects.

Upon capturing all scenes for all variations, step 110 is electronically merging, via a computer processing device, the multiple takes to illustrate the object action. As described in greater detail below, such as in FIG. 10, the merging includes selecting segments of the multiple takes, merging these segments. The merged segments produce the scene. The resulting scene gives the visual effect of animation by having different objects appear in these merged segments. The movement of the object using the motion track provides for continuous movement of the object amongst the segments, the visual difference being the illustrative effect of object action by the sequence of objects at their different phases.

Other embodiments provide for further refinement of the object phases. One embodiment is physically generating more phases of the objects, capturing more takes of the scene and merging these more granular segments. Another embodiment is employing graphical processing techniques.

Step 112 is electronically generating intermediate graphical representations between objects. As described in greater detail below, such as with respect to FIG. 11, computer graphical processing techniques allow for generating intermediate images between physical phases of the object. In one embodiment, this may be performed using a technology commonly referred to as morphing technology, which electronically generates an intermediate image between two phases.

In step 114, the method provides for integrating the intermediate graphical representations between the variations in the electronically merged takes of the scene. Steps 112 and 114 can smooth the visual effect of animation between different objects representing different phases. This smooths the visual effect, reduces the number of variations needing to be manufactured, as well as reduces the number of takes required for a scene.

Figure 2:
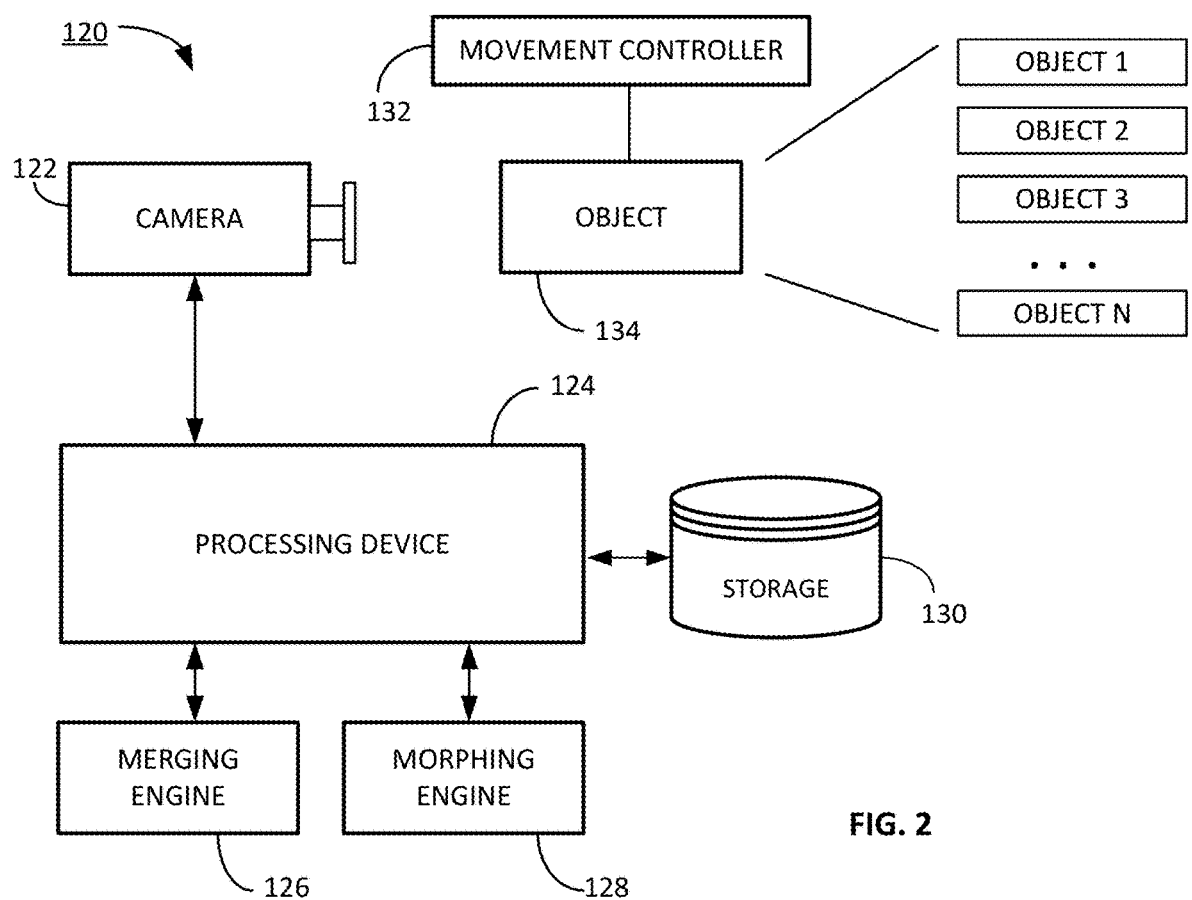
FIG. 2 illustrates a block diagram of one embodiment of a system for generating a visual effect of animation.

The flowchart of FIG. 1 provides general methodology of the visual effect using physical objects. FIG. 2 illustrates a system 120 for capturing the multiple takes of a scene. The system 120 includes a camera 122 connected to a processing device 124, which includes a merging engine 126 and a morphing engine 128. The processing device additionally includes a storage device 130.

Within the system 120, a movement controller 132 controls an object 134. The object 134 is one of any number of different objects. Each variation of the object represents a different phase of the object action. It is further noted, the object 134 may be one or more components of a puppet or other visual element interacting with the controller 132.

The camera 122 may be any suitable image capturing device, as generally recognized in the arts. The camera 122 provides for capturing a take of the scene, with the object 134 moving in response to the movement controller, such as a motion rig or a puppeteer. The camera 122 can locally store the captured images via a local memory device, or in another embodiment can directly transfer the captured images to the processing device 124.

The processing device 124 may be any suitable computer processing device capable of performing processing operations. The processing device 124 performs operations including receiving and processing the captured images from the camera 122, as well as storing the captured images in the storage device 130.

The storage device may be any suitable device or devices operative to store data, including a local storage device or one or more networked storage devices. For example, the storage device 130 can be a local hard drive or external hard drive, or the storage device 130 can be a cloud-based storage device.

The processing device 124 may be one or more processing devices or systems performing processing operations, including video editing operations. The processing device 124 includes a merging engine 126, where the merging engine 126 can be one or more video editing software applications transforming the multiple takes into a single scene, as described in greater detail below.

The processing device 124 includes a morphing engine 128, wherein the morphing engine 128 can be one or more video transforming software applications to generate visual effects, as described in greater detail below.

The processing device 124 includes other processing operations as recognized by one skilled in the art. For example, the processing device 124 includes additional video editing software, as well as audio editing and mixing software. For example, additional software may include image and video adjustment software, such as modifying contrast, brightness, etc.

The movement controller 132 may be any suitable device providing for repeatability of control of the object 134 or a puppet or device holding, connected to, or associated with the object. In one embodiment, the movement controller can be a mechanical device providing physical movement. In another embodiment, a skilled puppeteer can manually manipulate and control the puppet.

Further discussion of the system 120 is described with respect to the figures below.

Figure 3:
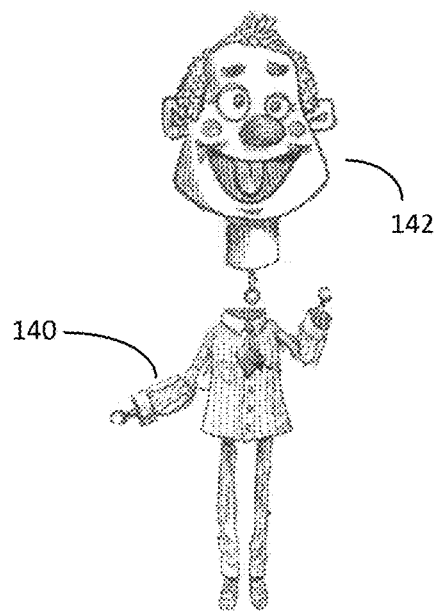
FIG. 3 illustrates one embodiment of a puppet having a first variation of the object.

FIG. 3 illustrates one embodiment of a puppet 140. The puppet 140 includes multiple moveable parts, including a head 142. In one embodiment, the head 142 may be the object 134 of FIG. 2.

Figure 4:
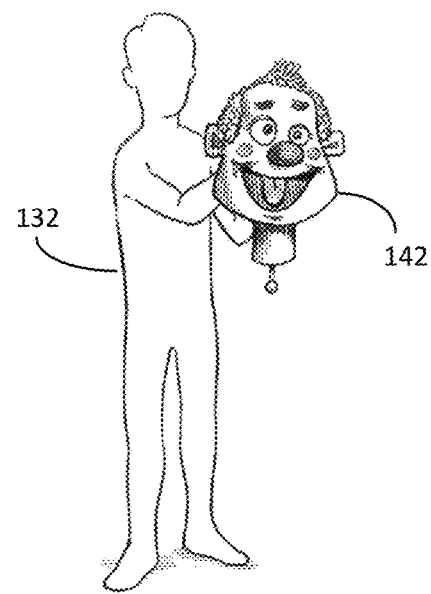
FIG. 4 illustrates one embodiment for controlling the puppet.

FIG. 4 illustrates the puppet head 140 controlled by a puppeteer, here the movement controller 132. In another embodiment, control can be performed by a motion rig. Thus, puppet movements and actions are generated using the puppeteer, motion rig or combination thereof, the movements and actions repeatable for multiple takes.

Figure 5:
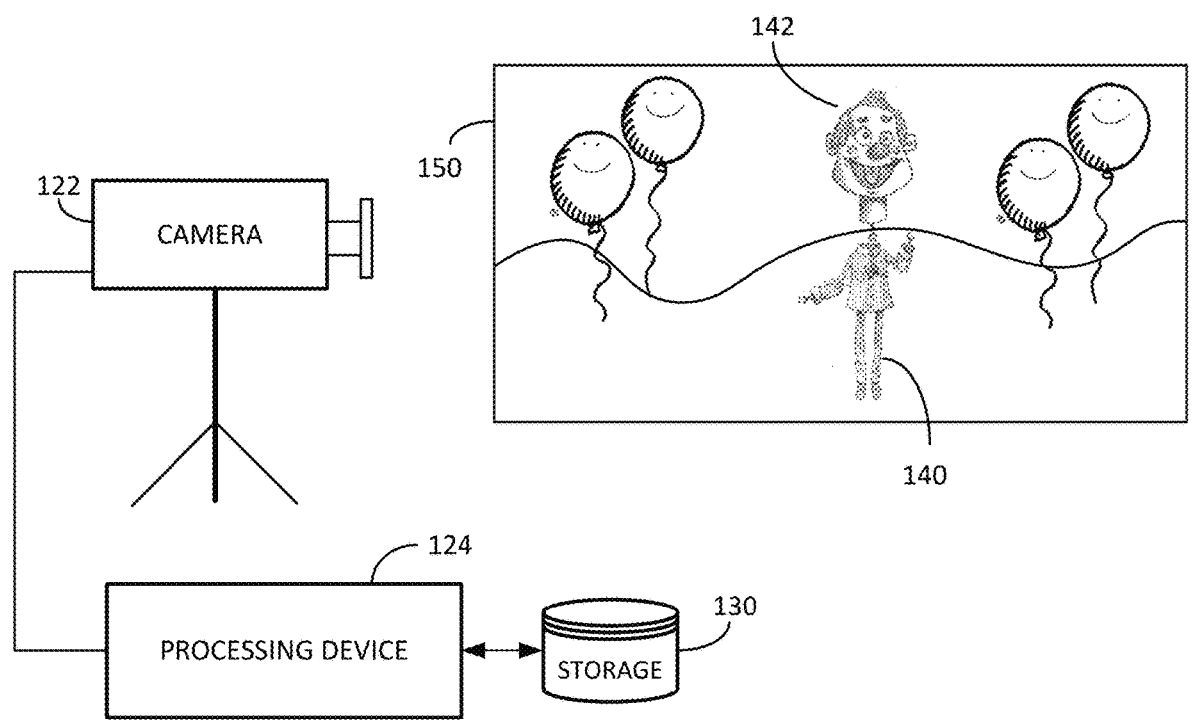
FIG. 5 illustrates a video capture system.

FIG. 5 illustrates capturing a scene with the puppet 140, movement controlled with a movement controller (not shown). For example, the take may be captured using a green-screen allowing for the puppeteer to remain unseen. The camera 124 is positioned to record the movement of the puppet 140. In one embodiment, the puppet 140 is positioned on front of a backdrop or set 150.

In one embodiment, the scene capture may be performed using techniques described in co-pending patent application Ser. No. 15/614,645 filed Jun. 6, 2017 entitled "Multi-Track Puppetry," the disclosure of which is hereby incorporated by reference.

The camera 122 captures the take of the scene, transferring the captured images to the processing device 124 engaged with the storage device 130.

In this exemplary embodiment, the puppet 140 includes the object 142. The object 142 is a variation showing a phase of the object action. The object action can be one or more suitable actions, such as a change in facial expression, movement of the mouth to speak, eye movements, etc. In this exemplary embodiment, the object action can be a wink of the left eye. Thus, the object 142 here is the puppet head in a first phase, both eyes being wide open.

Figure 6:
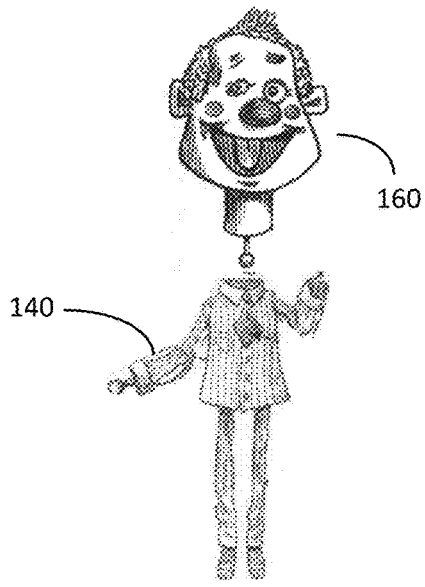
FIG. 6 illustrates another embodiment of the puppet having a second variation of the object.

Upon recording the first take, an operator can swap out the puppet head, object 142. FIG. 6 illustrates the puppet 140 including a new object 160 representing a new phase of the object action. This object 160 includes the left eye being lowered, a next phase in the action of winking in the left eye.

Figure 7:
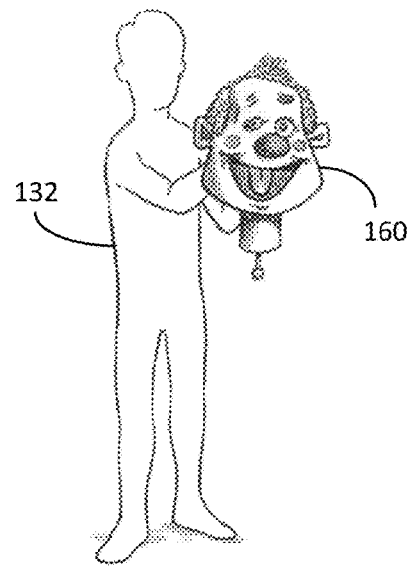
FIG. 7 illustrates controlling the puppet with the second variation.

FIG. 7 illustrates the puppeteer 132 for controlling the object 160 to the movement of the object 160.

Figure 8:
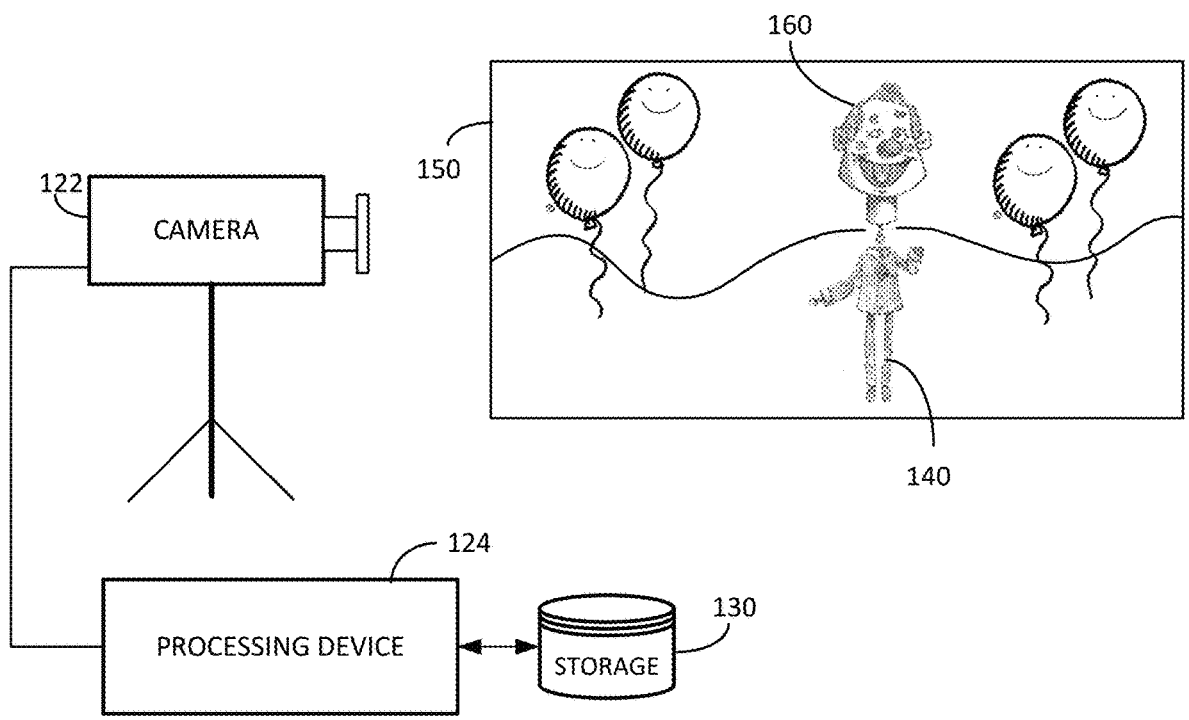
FIG. 8 illustrates the video capture system.

FIG. 8, similar to FIG. 5, illustrates the camera 122 capturing a new take of the scene. The take of the scene includes controlled movement of the puppet 140 and object 160 in front of the background 150 using the same movement pattern as the take acquired in FIG. 5. The processing device 124, engaged with the storage device 130, receives the captured video.

Figure 9:
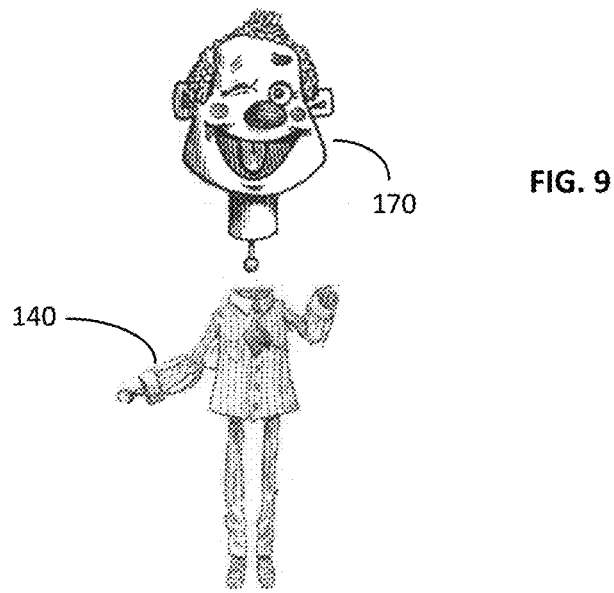
FIG. 9 illustrates another embodiment of the puppet having a third variation of the object.

In this exemplary embodiment of the object action being a left eye wink, a third object may be the closure of the left eye. FIG. 9 illustrates the puppet 140 having the third object 170 attached thereto. A further take of the scene is acquired using the puppet 140 and object 170, such as using the same process noted in FIGS. 5 and 8 above.

As noted in FIG. 1, the methodology includes acquiring takes for each of the different objects. The number of objects is determined by the number of phases in the object action. Thus, complex object actions may require a large number of objects and thus a large number of takes. The movement of the puppet is repeatable in all takes, such as using a trained puppeteer or the motion rig.

Figure 10:
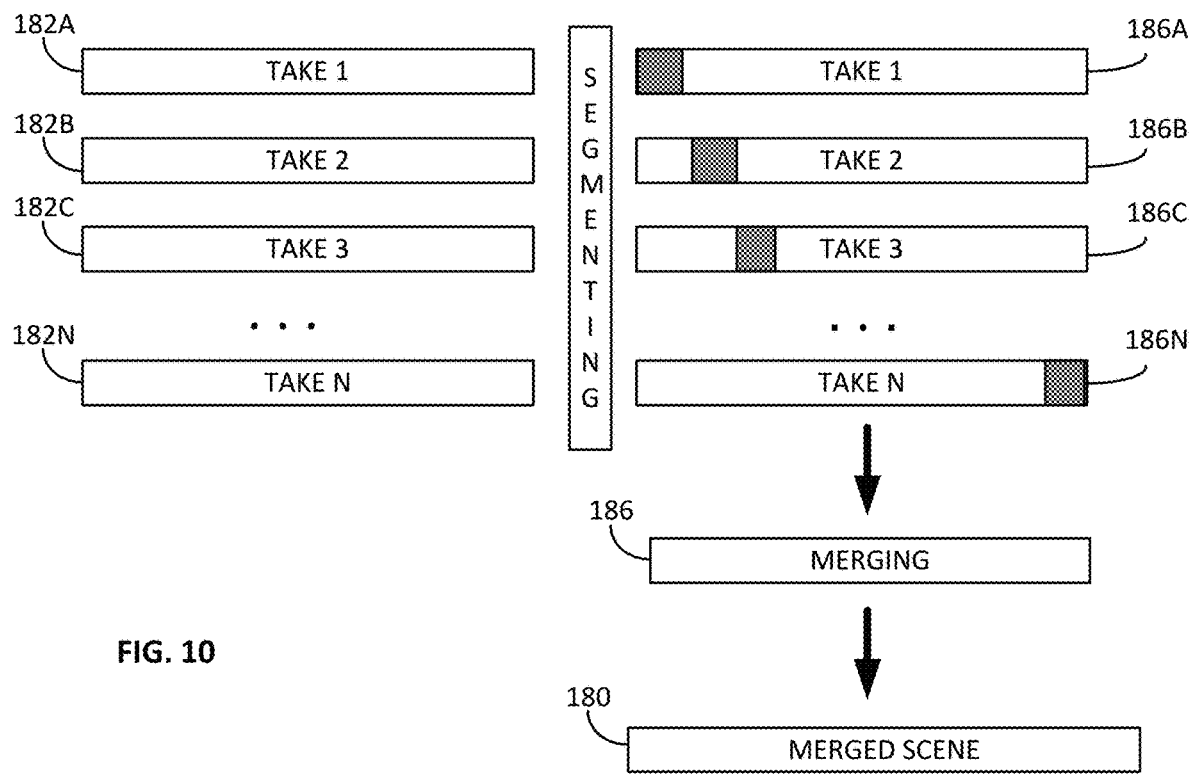
FIG. 10 illustrates a graphical representation of merging a plurality of takes.

After acquiring multiple takes, these takes are then merged into a scene generating the visual effect of animation. FIG. 10 illustrates a graphical representation of generating a merged scene 180. FIG. 10 illustrates processing operations performed by the processing device 124 of FIG. 2 after acquiring the multiple takes.

For illustration purposes, the processing includes a plurality of takes 182A-182N, where N indicates any suitable number of objects. For example, if the object action is defined by 25 phases, this translates to 25 takes of the scene, each take showing object movement and the merging of the takes to generate the visual effect of animation of the object action.

The processing device can operate a segmenting operation 184, which can designate portions of each take, as illustrated in takes 186a-186n. The darkened sections of each take represent a segment of video.

A merging operation 188 thus merges the segments into the merged scene 180.

In one embodiment, the segmentation and merging operations may be automatically performed using predetermined processing operations. For example, knowing a scene length and the number of takes, the processing device may then calculate the length of each segment. Knowing each segment length allows for the automated segmentation and merging to generate the merged scene.

In another embodiment, the generation of the merged scene can be performed in response to user controls and manipulation of user interface software with the processing device. For example, one embodiment may include fader-type operations allowing for fader operations between multiple takes. Where the movement of object in the scene is controlled by the motion rig, an overlay of all takes generates the same scene but for variations in the objects. Using an image processing fader operation can highlight and minimize different takes of the scenes in multiple steps to generate the merged scene.

Therefore, by merging the multiple takes, the end result is the merged scene having a visual effect of animation.

Figure 11:
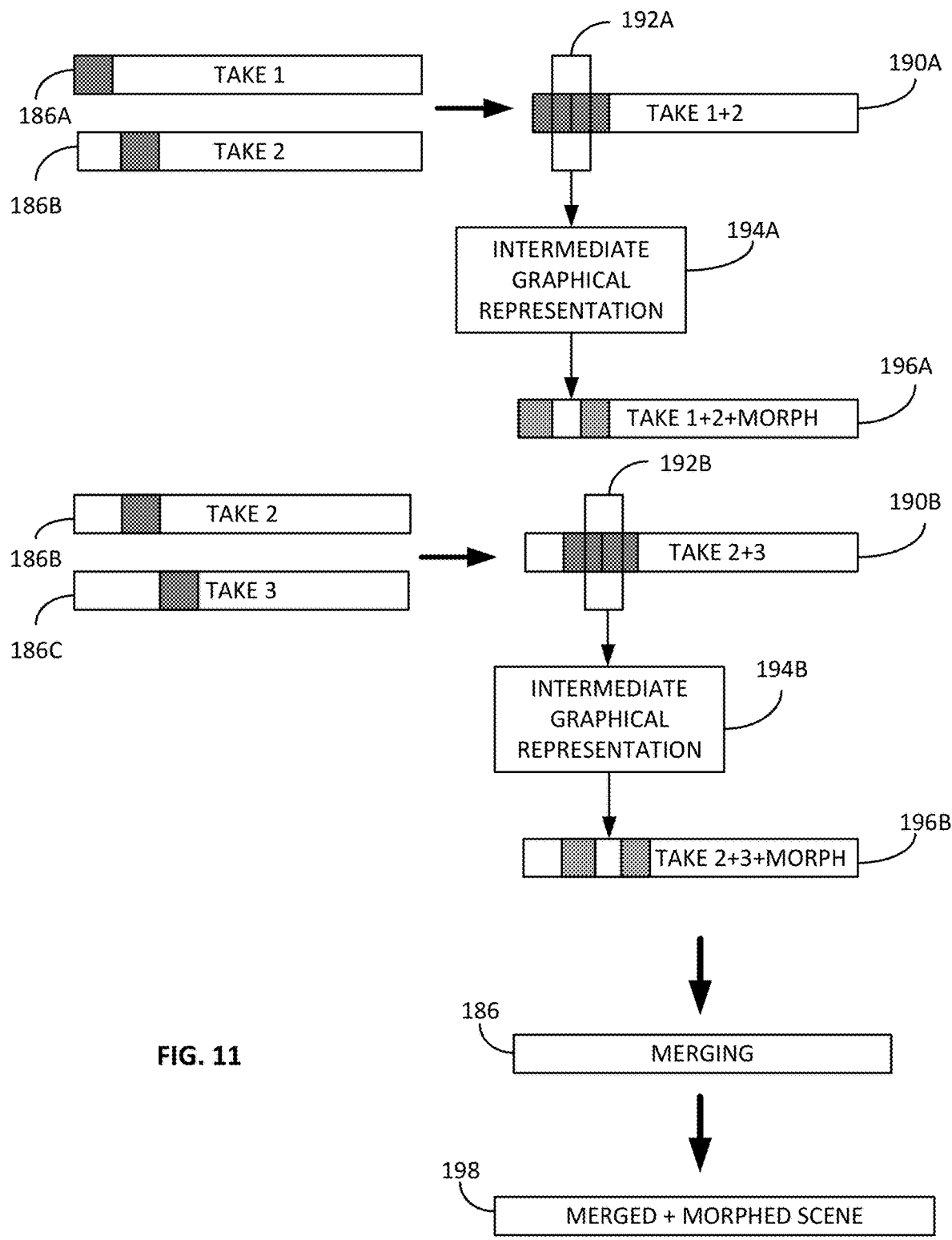
FIG. 11 illustrates a graphical representation of merging and morphing a plurality of takes.

FIG. 11 illustrates a further embodiment of generating a visual effect of animation. Where the merged scene of FIG. 10 includes multiple takes, each take having a different phase of the object action, the smoothness of the animation is reliant on the number of phases. FIG. 11 provides for electronically generating intermediate graphical representations of the object. The graphical representations illustrate transitions of the object between object phases of the object action. Using the FIGS. 3-9 example of winking, the object phases may be movement of the eye closing by 2 inches per phase, but the intermediate graphical representation can be movement at 1 inch, directly between the two phases or electronically generating any animation of the transition between phases.

By generating and inserting these intermediate graphical representation, FIG. 11 can smooth out the visual effect of the animation. The generating of the intermediate graphical representation is performed by electronically comparing the object in the consecutive takes. One technique may include using a processing technique similar to morphing processing operations.

This processing operation of FIG. 11 is performed by the processing device 124 in response to executable instructions. The processing may be performed by an operator giving instructions via a user interface or can be an automated process.

As illustrated in FIG. 11, one embodiment includes using the takes 186 having the segments identified. In this example, the first take 186A and the second take 186B are merged in the combined video segment 190A. The combined segments are then analyzed 192A to generate the intermediate graphical representation 194A.

As noted above, the intermediate graphical representation is the intermediate between object phases. Where the takes 186 include image capture of the actual objects, the intermediate graphical representation is a processing construct of a computer-generated image or images illustrates between phases.

Using the computer processing device, the combination of takes 190A is then updated to generate combinations of the two takes plus the intermediate graphical representation, 194B. This generates the partial scene 196A.

The processing of generating intermediate graphical representations can be repeated for multiple takes. FIG. 11 illustrates repeating the process for two take 186B, 186C, with generating combined take 190*b* and intermediate graphical representation 194B. Integrating the intermediate graphical representation 194B generates the partial scene 196B.

The process is repeated for the combined takes, the partial scenes 196 then merged consistent with FIG. 10 above. This generates the merged and morphed scene 198. Similar to the merged scene 180 of FIG. 10, this generates the visual effect of animation, where the inclusion of the intermediate graphical representation smooths out the per-phase transition of the multiple objects in multiple takes.

Herein, the method and system provides for animated visual effects of an object with multiple takes of a scene. The motion rig allows repeatability of the takes of the scene, each take having a different object in a different phase of the object action. The computer processing device then merging the multiple takes generates a final scene showing animation of using a puppet or other physical device.

FIGS. 1 through 11 are conceptual illustrations allowing for an explanation of the present invention. Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, Applicant does not intend for any term in the specification or claims to be ascribed an uncommon or special meaning unless explicitly set forth as such. Further, the present invention encompasses present and future known equivalents to the known components referred to herein by way of illustration.

The foregoing description of the specific embodiments so fully reveals the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein.

What is claimed is:

1. A method for generating a visual effect of animation, the method comprising:
   defining a motion track for object movement within a scene;
   electronically capturing a first take of the scene with a first object moving within the motion track, the first object illustrating a first phase of an object action;
   replacing the first object with a second object, the second object representing a second phase of the object action;
   electronically capturing a second take of the scene with the second object moving within the motion track;
   using a computer processing device, electronically merging the first take and the second take generating the visual effect of animation of the object action.

2. The method of claim 1 further comprising:
   electronically generating an intermediate graphical representation between the first object and the second object; and
   integrating the intermediate graphical representations between the first take and the second take within the visual effect of animation of the object action.

3. The method of claim 2, wherein the intermediate graphical representation is performed using a computerized morphing operation.

4. The method of claim 1 further comprising:
   replacing the second object with a third object, the third object representing a third phase of the object action;
   electronically capturing a third take of the scene with the third object moving within the motion track; and electronically merging the first take, the second take, and the third take generating the visual effect of animation of the object action.

5. The method of claim 4 further comprising:
electronically generating a second intermediate graphical representation between the second object and the third object; and
integrating the second intermediate graphical representations between the second take and the third take within the visual effect of animation of the object action.

6. The method of claim 1 wherein the first object and the second objects are puppets.

7. The method of claim 6, wherein the object action is a facial movement including at least one of: a reaction and speaking.

8. The method of claim 1, wherein the motion track for object movement is controlled by a motion control device operating in response to electronic movement controls.

9. The method of claim 1 further comprising:
defining a camera movement pattern; and
capturing the first take and the second take using a camera moving along the camera movement pattern.

10. A system for generating a visual effect comprising:
a first object representing a first phase of object action;
a second object representing a second phase of the object action;
a camera operative to electronically capture a first take of a scene with the first object moving within a defined motion track and electronically capture a second take of the scene with the second object replacing the first object and moving within the defined motion track; and
an electronic processing device, in response to executable instructions, operative to merge the first take and the second take generating the visual effect of animation of the object action.

11. The system of claim 10, the electronic processing device further operative to:
electronically generate an intermediate graphical representation between the first object and the second object; and
integrate the intermediate graphical representations between the first take and the second take within the visual effect of animation of the object action.

12. The system of claim 10 further comprising:
a third object representing a third phase of the object action;
the camera electronically capturing a third take of the scene with the third object replacing the second object and moving within the defined motion track; and
the electronically processing device operative to electronically merge the first take, the second take, and the third take generating the visual effect of animation of the object action.

13. The system of claim 10 wherein the first object and the second objects are puppets.

14. The system of claim 13, wherein the object action is a facial movement including at least one of: a reaction and speaking.

15. The system of claim 10 further comprising:
a camera motion control device defining camera movement such that electronic capture of the first take and second take are performed by moving the camera as controlled by the camera motion control device.

16. A method for generating a visual effect of animation, the method comprising:
generating a plurality of objects, where each of the plurality of objects represent different phases of an object action;
defining a motion track for object movement within a scene;
electronically capturing a plurality of takes of the scene, each of the takes including one of the plurality of objects, the one of the plurality of objects within the scene being moved along the motion track;
using a computer processing device, electronically merging the plurality of takes of the scene to generate the visual effect of animation of the object action.

17. The method of claim 16 further comprising:
electronically generating a plurality of intermediate graphical representations based on the plurality of the objects; and
integrating the plurality of intermediate graphical representations between the plurality of objects in the plurality of takes to generate the visual effect of animation of the object action.

18. The method of claim 17, wherein the intermediate graphical representations are performed using a computerized morphing operation.

19. The method of claim 16 wherein the objects are each a puppet.

20. The method of claim 19, wherein the object action is a facial movement including at least one of: a reaction and speaking.

* * * * *